United States Patent

Soika et al.

(10) Patent No.: US 8,748,747 B2
(45) Date of Patent: Jun. 10, 2014

(54) ARRANGEMENT WITH AT LEAST ONE SUPERCONDUCTIVE CABLE

(75) Inventors: Rainer Soika, Hannover (DE); Beate West, Hannover (DE); Ing Mark Stemmle, Hannover (DE)

(73) Assignee: Nexans, Paris (FR)

( * ) Notice: Subject to any disclaimer, the term of this patent is extended or adjusted under 35 U.S.C. 154(b) by 355 days.

(21) Appl. No.: 13/186,565

(22) Filed: Jul. 20, 2011

(65) Prior Publication Data

US 2012/0055172 A1 Mar. 8, 2012

(30) Foreign Application Priority Data

Sep. 2, 2010 (EP) .................................... 10305941

(51) Int. Cl.
*H01B 12/00* (2006.01)
*H01L 39/24* (2006.01)

(52) U.S. Cl.
USPC .................. 174/125.1; 174/155; 505/230

(58) Field of Classification Search
USPC ................ 174/155, 125.1; 505/230
See application file for complete search history.

(56) References Cited

U.S. PATENT DOCUMENTS

| 2,886,631 | A | * | 5/1959 | Muller | 174/108 |
| 3,368,247 | A | * | 2/1968 | Orban | 24/16 R |
| 4,356,345 | A | * | 10/1982 | Gonia | 174/117 F |
| 5,304,739 | A | * | 4/1994 | Klug et al. | 174/102 R |
| 5,463,188 | A | * | 10/1995 | Nohmi et al. | 174/108 |
| 6,417,458 | B1 | * | 7/2002 | Mukoyama et al. | 174/125.1 |
| 6,730,851 | B2 | * | 5/2004 | Ladie' et al. | 174/125.1 |
| 7,323,640 | B2 | * | 1/2008 | Takahashi et al. | 174/106 R |
| 7,463,461 | B2 | * | 12/2008 | Lee et al. | 361/19 |
| 7,605,329 | B2 | * | 10/2009 | Schmidt et al. | 174/15.4 |
| 8,112,135 | B2 | * | 2/2012 | Allals et al. | 505/230 |
| 8,583,202 | B2 | * | 11/2013 | Schmidt et al. | 505/230 |
| 8,588,877 | B2 | * | 11/2013 | Soika et al. | 505/230 |
| 2009/0131261 | A1 | | 5/2009 | Schmidt et al. | |
| 2010/0152049 | A1 | * | 6/2010 | Soika et al. | 505/163 |
| 2011/0275521 | A1 | * | 11/2011 | Stemmle et al. | 505/163 |

FOREIGN PATENT DOCUMENTS

JP 01024314 A * 1/1989 ............. H01B 12/08

* cited by examiner

*Primary Examiner* — Jeremy C Norris
*Assistant Examiner* — Nathan Milakovich
(74) *Attorney, Agent, or Firm* — Sofer & Haroun, LLP

(57) ABSTRACT

An arrangement with at least one superconductive cable (1) is indicated which is arranged in a cryostat (KR) serving for guiding a cooling agent, wherein the cryostat (KR) includes at least one thermally insulated metal pipe. To the outside of the cryostat (KR) is applied an electrically well conductive material that is composed of at least two strands (6, 7) which are wound one around the other with oppositely pitched direction around the cryostat (KR). The strands are connected fixedly and immovably to the cryostat (KR) at fixed points (8) mounted longitudinally spaced along an axial length of said cryostat.

1 Claim, 1 Drawing Sheet

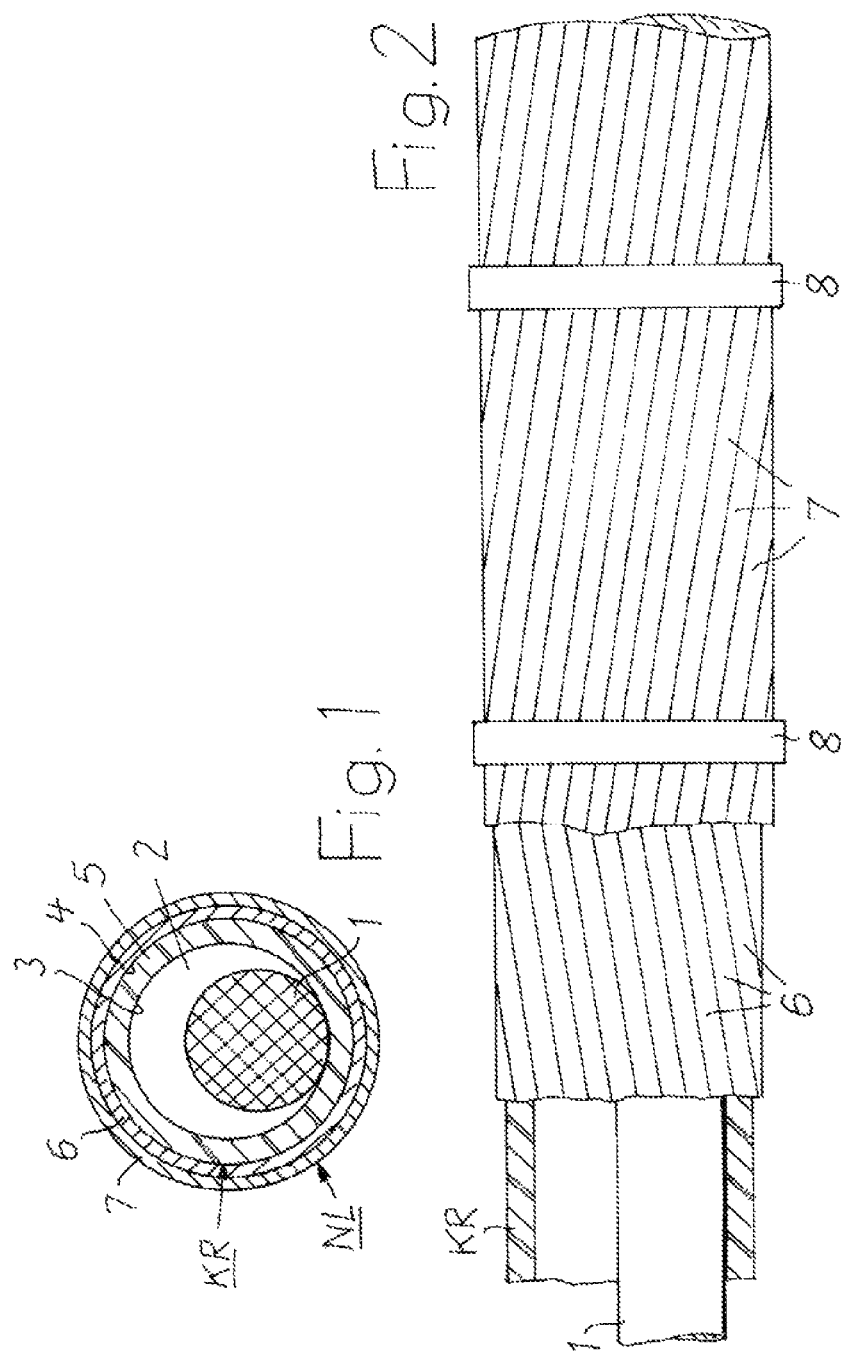

ARRANGEMENT WITH AT LEAST ONE SUPERCONDUCTIVE CABLE

RELATED APPLICATION

This application claims the benefit of priority from European Patent Application No. 10 305 941.6, filed on Sep. 2, 2010, the entirety of which is incorporated by reference.

BACKGROUND

1. Field of the Invention

Arrangement with at least one superconductive cable which is arranged in a cryostat serving for conducting a cooling agent, wherein the cryostat includes at least one thermally insulated metal pipe, wherein an electrically well insulated material is arranged on the outside on the cryostat, wherein the electrically well insulated material contacts the cryostat (EP2 071 589 A1).

2. Description of Related Art

A superconductive cable has at least one conductor of a special material which, at sufficiently low temperatures, changes over into the superconductive state. The direct current resistance of the conductor then equals 0. Suitable materials are, for example, YPCO (yttrium-barium-copper oxide) or BISCCO (bismuth-strontium-calcium-copper oxide). At sufficiently low temperatures for such a material are, for example, between 4 K and 110 K for reaching the superconductive state. Suitable cooling agents are, for example, nitrogen, helium, neon and hydrogen or mixtures of these materials, each in the gaseous or liquid state. Superconductive cables with cold dielectric and hot dielectric are known.

In a superconductive cable with cold dielectric, the superconductive conductor is surrounded by a dielectric consisting of layers of insulating material, wherein a liquid cooling agent is present as an impregnating agent in the dielectric (insulation). Such a cable is composed, for example, of the conductor as internal conductor and a screen or return conductor which is arranged concentrically which are separated from each other and kept at a distance from each other by the dielectric. An appropriate cable of this type is surrounded by a cryostat which conducts a cooling agent, wherein the cryostat consists of, for example, two concentrically arranged metal pipes which are insulated relative to each other by a thermal insulation.

Superconductive cables with hot dielectric include a conductor which is arranged directly in a cryostat conducting the cooling agent. In this case, dielectric and screen or return conductor are arranged outside of the cryostat while contacting the latter.

In all known arrangements with superconductive cables, no matter whether with cold or hot dielectric, the electrical conductors must be dimensioned in such a way that the energy input in the case of a short circuit does not lead to the destruction of the cable and/or to undo heating of the cable. This requires a sufficiently large electrically conductive cross-section of the conductor with appropriately large dimensions of the respective arrangement. In addition, there is the fact that such an arrangement composed of cryostat and enclosed superconductive cable must be pulled into the cable for its operation. For this purpose, on the outside of the cryostat is attached a pulling mechanism through which the dimensions of the arrangement are further increased. Moreover, the inside width must be adapted to these relatively large dimensions.

OBJECT AND SUMMARY

In the known arrangement in accordance with the above-mentioned EP 2 071 589 A1, a normal conductor composed of an electrically well conducting material, which is connected to a superconductive cable surrounded by a cryostat which contacts the outside against the cryostat. As a result the normal conductor is at room temperature and thus, especially outside of the cooling range which is effective during the operation of the cable. Any energy introduced in the case of a short circuit does not burden the cooling system within the cryostat. This arrangement composed of cable and cryostat is also pulled in a cable duct when it is moved. For this purpose in the known technology, the already mentioned complicated pulling mechanism is attached to the outside of the cryostat. Thus, the external dimensions of this arrangement are relatively large.

The invention is based on the object of constructing the above described arrangement in such a way that its radial dimensions can be reduced.

In accordance with the invention this object is met in that the electrically well conducting material is composed of at least two strands which are wound around the cryostat in two layers one above the other with oppositely directed pitch direction, and the strands are fixedly and immovably connected to the cryostat at fixed points provided at axial spacings.

The radial dimensions of the superconductive cable of this arrangement can be reduced because no normally conductive screen which would directly surround the cable is present. The function of the screen is assumed by the strands which are arranged outside of the cryostat while contacting the cryostat, wherein the strands are arranged in at least two layers with an appropriate electrically conductive cross-section. Therefore, they can also conduct an increased short circuit current, they do not burden the cooling system of the superconducting cable because of their arrangement outside of the cryostat. Because of the reduced dimensions of the superconductive cable, the dimensions of the cryostat can also be reduced. Since the strands are fixedly connected to the cryostat at axial spacings, the tensile strength of the cryostat or of the entire arrangement is significantly increased, wherein the strands themselves also act as pulling elements. Therefore, the entire arrangement can be pulled, for example, into a cable duct with a simple pull rope or a cable grip which both do not significantly wear in the radial direction, and therefore the cable duct may also have a reduced inside width. Pull rope or cable grip are used for pulling the arrangement into a cable duct, especially also in the case of larger length at the beginning of the end of the arrangement. They can subsequently be removed again.

BRIEF DESCRIPTION OF THE DRAWINGS

An embodiment of the subject matter of the invention is illustrated in the drawings, In the drawings:

FIG. 1 shows a cross-section of the arrangement according to the invention.

FIG. 2 shows a side view of the arrangement according to FIG. 1 with layers being partially removed.

DETAILED DESCRIPTION

The strands of electrically well conductive material can be of copper or aluminum or alloys of these materials. In the following they will be referred to as "copper strands" representative of all possible embodiments.

The superconductive cable utilized in the arrangement according to the invention is advantageously constructed as a cable with cold dielectric. In the following for simplicity's sake, they're referred to as "cable." The cryostat surrounding the cable has at least one thermally insulated metal pipe. In the described embodiment, the cryostat is composed of two metal pipes arranged concentrically relative to each other, between which is arranged a thermal insulation. The pipes can be undulated transversely of their longitudinal direction. In the cryostat also more than one cable can be accommodated.

The cable illustrated in FIG. 1 is constructed as a single-phase cable with cold dielectric. It has a cable core 1 in which is arranged an internal conductor of superconductive material which initially is surrounded at least by a dielectric. The cable core 1 is arranged in a cryostat KR with the inclusion of a continuous free space 2. The cryostat KR—as already mentioned—is composed of two concentric metal pipes 3, and 4 which are separated from each other by an annular space 5. A thermal insulation is provided in the annular space 5. A cooling agent is conducted through the cryostat KR for cooling the superconductor of the cable, for example, liquid nitrogen. Outside of the cryostat KR is arranged a normal conductor NL which contacts the cryostat KR or its outer pipe 4. It is electrically conductively connected to the cryostat KR so that these parts are on the same electrical potential.

The normal conductor NL is composed of at least two copper strands 6 and 7 which are wound around the cryostat KR in two layers one above the other, and, namely, with oppositely directed pitch direction. The pitch length of the two copper strands 6 and 7 is advantageously equal. The copper strands 6 and 7 can be constructed as round wires, as strips, or, in a preferred embodiment as conductor profiles. For mechanical reasons they are wound with a pitch length which is as large as possible around the cryostat KR, so that they can absorb tensile forces without significantly burdening the cryostat KR in the circumferential direction. In this connection, it is also possible to take into consideration aspects of current distribution. In order to avoid a potentially significant current during normal operation, the pitch length of the two copper strands 6 and 7 can also be constructed shorter than the intended ideal pitch length intended for mechanical reasons.

At least two copper strands 6 and 7 are present for the normal conductor NL. However, it is also possible to apply more than two layers of copper strands whose number is always a multiple of "2."

The copper strands 6 and 7 are circumferentially tightly connected to the cryostat KR at axial spacings with fixed points 8, wherein the stability of the cryostat in the axial direction is increased as a result to such an extent that any tensile forces exerted on the cryostat can be absorbed directly and without undesired elongation of the cryostat KR in the axial direction. The fixed points 8 can be produced, for example, by bandages or sleeves which are placed with a sufficiently tight seat around the copper strands 6 and 7 which surround the cryostat KR and contact the cryostat with copper strands 6 and 7.

The invention claimed is:

1. An arrangement comprising:
    at least one superconductive cable;
    a cryostat, with said superconductive cable therein, serving for conducting a cooling agent, wherein the cryostat is made from at least one thermally insulated metal pipe
    an electrically conducting material is arranged on the outside of and in contact with the cryostat, the electrically conducting material formed from at least two strands which are wound circumferentially around the cryostat in two adjacent concentrically applied layers with oppositely directed pitch direction; and
    at least two bandages or sleeves, wherein said bandages or sleeves are applied so as to fixedly and immovably connect said strands to the cryostat at fixed points, said bandages or sleeves longitudinally spaced along an axial length of said cryostat, sufficiently so that said strands may be used as a pulling elements for said arrangement.

* * * * *